United States Patent [19]
Doan

[11] Patent Number: 6,128,856
[45] Date of Patent: Oct. 10, 2000

[54] AUTOMATIC WATERING POT

[76] Inventor: Linh V. Doan, 2227 Marble Falls Dr., Carrollton, Tex. 75007

[21] Appl. No.: 09/272,357

[22] Filed: Mar. 19, 1999

[51] Int. Cl.[7] .................................................... A01G 27/00
[52] U.S. Cl. .............................................................. 47/48.5
[58] Field of Search ................................ 47/48.5, 79, 80, 47/82, 83

[56] References Cited

U.S. PATENT DOCUMENTS

| | | |
|---|---|---|
| 1,940,044 | 12/1933 | Brandt . |
| 1,993,631 | 3/1935 | Smith . |
| 3,069,807 | 12/1962 | Wall . |
| 3,389,499 | 6/1968 | Haile . |
| 3,542,069 | 11/1970 | Ollison . |
| 4,060,934 | 12/1977 | Skaggs ........................................ 47/79 |
| 4,115,951 | 9/1978 | Becker et al. . |
| 4,148,155 | 4/1979 | Allen . |
| 4,291,836 | 9/1981 | Chen-Hsiung ........................ 47/48.5 X |
| 4,542,762 | 9/1985 | Littlehale . |
| 4,578,897 | 4/1986 | Pazar et al. . |
| 4,653,529 | 3/1987 | Freeman . |
| 4,685,246 | 8/1987 | Fennell . |
| 4,829,709 | 5/1989 | Centafanti . |
| 4,848,029 | 7/1989 | Han ............................................. 47/79 |
| 4,970,823 | 11/1990 | Chen et al. ............................... 47/48.5 |
| 5,076,009 | 12/1991 | Cibor ...................................... 47/79 X |
| 5,097,626 | 3/1992 | Mordoch . |
| 5,259,142 | 11/1993 | Sax .......................................... 47/48.5 |
| 5,315,787 | 5/1994 | Schleicher et al. . |
| 5,421,122 | 6/1995 | Hyndman . |
| 5,425,198 | 6/1995 | Coy . |
| 5,444,940 | 8/1995 | White-Wexler et al. .................... 47/82 |
| 5,493,811 | 2/1996 | Tobias et al. ............................... 47/79 |
| 5,568,701 | 10/1996 | Haigler . |
| 5,725,156 | 3/1998 | Park ..................................... 47/48.5 X |
| 5,806,240 | 9/1998 | Racine . |
| 5,813,605 | 9/1998 | Chou ................................... 47/48.5 X |
| 5,921,443 | 7/1999 | McMillan ............................ 47/48.5 X |
| 5,924,240 | 7/1999 | Harrision ................................. 47/48.5 |

FOREIGN PATENT DOCUMENTS

| | | |
|---|---|---|
| 147851 | 4/1969 | United Kingdom . |
| 1598198 | 9/1981 | United Kingdom . |

*Primary Examiner*—Michael J. Carone
*Assistant Examiner*—Jeffrey L Gellner
*Attorney, Agent, or Firm*—Richard C. Litman

[57] ABSTRACT

The automatic watering pot is a flower pot with an automatic watering device for dispensing water into the soil at or below the root level of a potted plant. The automatic watering device has a bottle which serves as a water reservoir, a cap for the bottle having a rotary valve, a delivery tube inserted into the cap, and a dispersion fitting at the free end of the delivery tube. The automatic watering device is disposed with the bottle inverted above the level of the soil, the delivery tube extending into the soil, and the dispersion fitting to a depth equal to or below the level of the roots. The bottle is made from a translucent or transparent material, and may have a float so that the water level may be visually discerned. The cap has a rotary valve so that the flow of water from the bottle to the delivery tube may be cut off by rotating the cap when it is necessary to refill the bottle. The dispersion fitting has a plurality of pinhole orifices which serve to provide a path for water to flow from the tube into the soil, for air to enter the tube, and as a filter to prevent soil particles from entering the bottle.

21 Claims, 5 Drawing Sheets

AUTOMATIC WATERING POT

BACKGROUND OF THE INVENTION

1. Field of the Invention

The present invention relates to appliances for house plants, and particularly to an automatic watering pot for supplying water to a potted plant automatically.

2. Description of the Related Art

Potted plants are valued for their aesthetic appearance, their fragrance, and occasionally for their ability to freshen the air by producing oxygen from carbon dioxide. While potted plants require low maintenance, some varieties do require frequent watering and the administration of water soluble plant food or soil nutrients. A problem may arise if the plant owner takes an extended vacation and is unavailable to provide the plant with personal attention.

A related problem concerns proper watering of the plant. While plants must receive sufficient water, they should not be overwatered, as the plants roots need air in order for the plant to survive. With some potted plants, it may be difficult to tell by sight or by touch whether the plant is receiving enough, or too much, water. For these reasons, a device which senses the moisture condition of the soil and automatically dispenses water, which may be mixed with a water soluble plant food or soil nutrients, from a water reservoir is desirable. A variety of devices have been proposed to address these problems.

U.S. Pat. No. 1,940,044, issued Dec. 19, 1933 to E. Brandt, describes a flower pot having a double wall, a water compartment being disposed between the walls, a wick in the bottom of the compartment, and a plurality of holes at the base of the inner wall so that water is transported from the compartment, through the wick, and into the pot. U.S. Pat. No. 3,069,807, issued Dec. 25, 1962 to B. T. Wall, teaches a watering device using both siphon and capillary action, which has a U-shaped tube with one end extending into a container outside of the pot and the other end extending into the soil inside the pot, the tube being perforated below the level of the soil. The tube is filled with water to sustain capillary action, and siphons when the water level in the container is above the perforations.

U.S. Pat. No. 4,115,951, issued Sept. 26, 1978 to Becker, et al., shows a device having a perforated soil probe integrated with a water reservoir, the probe adapted to hang over the edge of the pot, with a wick extending from the bottom of the reservoir to the tip of the probe. U.S. Pat. No. 4,542,762, issued Sept. 24, 1985 to B. M. Littlehale, describes a complicated water dispensing apparatus for irrigation with a reservoir, a water outlet, an intermediate container, an air space container, an overflow tube, a feedback loop, and an inverted conical funnel.

U.S. Pat. No. 4,148,155, issued Apr. 10, 1979 to D. J. Allen, discloses a device for hydroponic plants with a reservoir having a water outlet tube enclosed in a standpipe which penetrates an inert growing medium, the outlet tube spaced apart from the mouth of the standpipe by a fixed distance, with an air vent penetrating the standpipe at the upper end of the standpipe. U.S. Pat. No. 4,578,897, issued Apr. 1, 1986 to Pazar, et al., teaches a water reservoir in the form of a plastic bottle having a shoulder about its mouth, an orifice defined in the shoulder, and a plastic tube having its end cut at an angle, the bottle being inverted and the tube penetrating the soil, so that when the water level is below the end of the tube, air enters the reservoir and forces water out of the orifice.

U.S. Pat. No. 4,653,529, issued Mar. 31, 1987 to G. W. Freeman, shows a plant watering device including a tray divided into two compartments by a partition wall, the reservoir being disposed in one compartment and the flower pot in the other compartment. U.S. Pat. No. 4,829,709, issued May 16, 1989 to R. Centafanti, describes a flower pot which fits into a reservoir, having a wick disposed inside a tube extending from the reservoir into the pot.

U.S. Pat. No. 5,097,626, issued Mar. 24, 1992 to Y. Mordoch, shows a watering device with an annular water reservoir which rests on top of the soil in the pot, and has a dryness sensor penetrating the soil which opens and closes a water outlet. U.S. Pat. No. 5,315,787, issued May 31, 1994 to Schleicher, et al., teaches a battery operated centrifugal pump placed in a water reservoir coupled to a moisture sensor in the soil, the sensor being two spaced apart electrodes. When the moisture drops below a predetermined level, the moisture sensor switches the centrifugal pump on through a transistor circuit to supply water to the pot.

U.S. Pat. No. 5,421,122, issued Jun. 6, 1995 to O. Hyndman, discloses a water reservoir with a flange used to suspend the reservoir over the top of a flower pot. The device includes a manually operated metered valve with a thumbscrew at the base of the reservoir. U.S. Pat. No. 5,425,198, issued Jun. 20, 1995 to G. R. Coy, describes a watering device having a tray with ribs on its floor. The flower pot is placed in the tray together with an inverted water bottle which is raised above the floor of the tray.

U.S. Pat. No. 5,568,701, issued Oct. 29, 1996 to J. C. Haigler, describes a water bottle with a conical neck, a capillary tube sealed in the neck, and a cap disposed over the capillary tube, the cap having a score line so that the cap can be broken away. The bottle is inverted with the capillary tube inserted into the soil just above the plant roots. U.S. Pat. No. 5,806,240, issued Sept. 15, 1998 to P. Racine, shows a water cylinder mounted on a support having a stake with wings to anchor the support in the soil, the support having a flexible tube leading to the soil and a screw which compresses the tube against a stop to control the drip rate.

U.K. Patent No. 147,851, published Apr. 10, 1969, describes a pot with double walls, water being disposed in a chamber defined by the double walls, and a plurality of orifices in the inner wall through which wicks communicate with the water chamber. United Kingdom Patent No. 1,598, 198, published Sept. 16, 1981, describes a similar device with more orifices described in the upper portion of the pot than the lower to provide the upper portion of the soil with more moisture.

None of the above inventions and patents, taken either singularly or in combination, is seen to describe the instant invention as claimed. Thus a automatic watering pot solving the aforementioned problems is desired.

SUMMARY OF THE INVENTION

The automatic watering pot is a flower pot with an automatic watering device for dispensing water into the soil at or below the root level of a potted plant. The automatic watering device has a bottle which serves as a water reservoir, a cap for the bottle having a rotary valve, a delivery tube inserted into the cap, and a dispersion chamber at the free end of the delivery tube. The automatic watering device is disposed with the bottle inverted above the level of the soil, the delivery tube extending into the soil, and the dispersion chamber to a depth equal to or below the level of the roots. The bottle is made from a translucent or transparent material, and may have a float so that the water level may be visually discerned. The cap has a rotary valve so that the flow of water from the bottle to the delivery tube may be cut off by rotating the cap when it is necessary to refill the bottle. The dispersion chamber has a plurality of pinhole orifices which serve to provide a path for water to flow from the tube into the soil, for air to enter the tube, and as a filter to prevent soil particles from entering the bottle.

The automatic watering device may be made integral with the pot, or it may be sold as an after market accessory for flower pots. The automatic watering pot may be made economically from thermoplastic or ceramic material.

Accordingly, it is a principal object of the invention to provide a flower pot with an automatic watering device for dispensing water and soluble plant food from a water reservoir without manual intervention for an extended period of time.

It is another object of the invention to provide an automatic watering device for potted plants with a transparent water reservoir having a float so that the water level may be quickly and easily monitored visually.

It is a further object of the invention to provide an automatic watering device for potted plants with a water reservoir inverted above the level of the soil in which the flow of water from the reservoir is controlled by a rotary valve in order to prevent water spills when refilling the reservoir.

Still another object of the invention is to provide an automatic watering device for potted plants which dispenses water to the soil through a dispenser chamber which senses the moisture level of the soil by the flow of air through the dispenser fitting and which acts as a filter to prevent the back flow of soil particles into the water reservoir by providing the dispenser chamber with a plurality of pinhole orifices.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
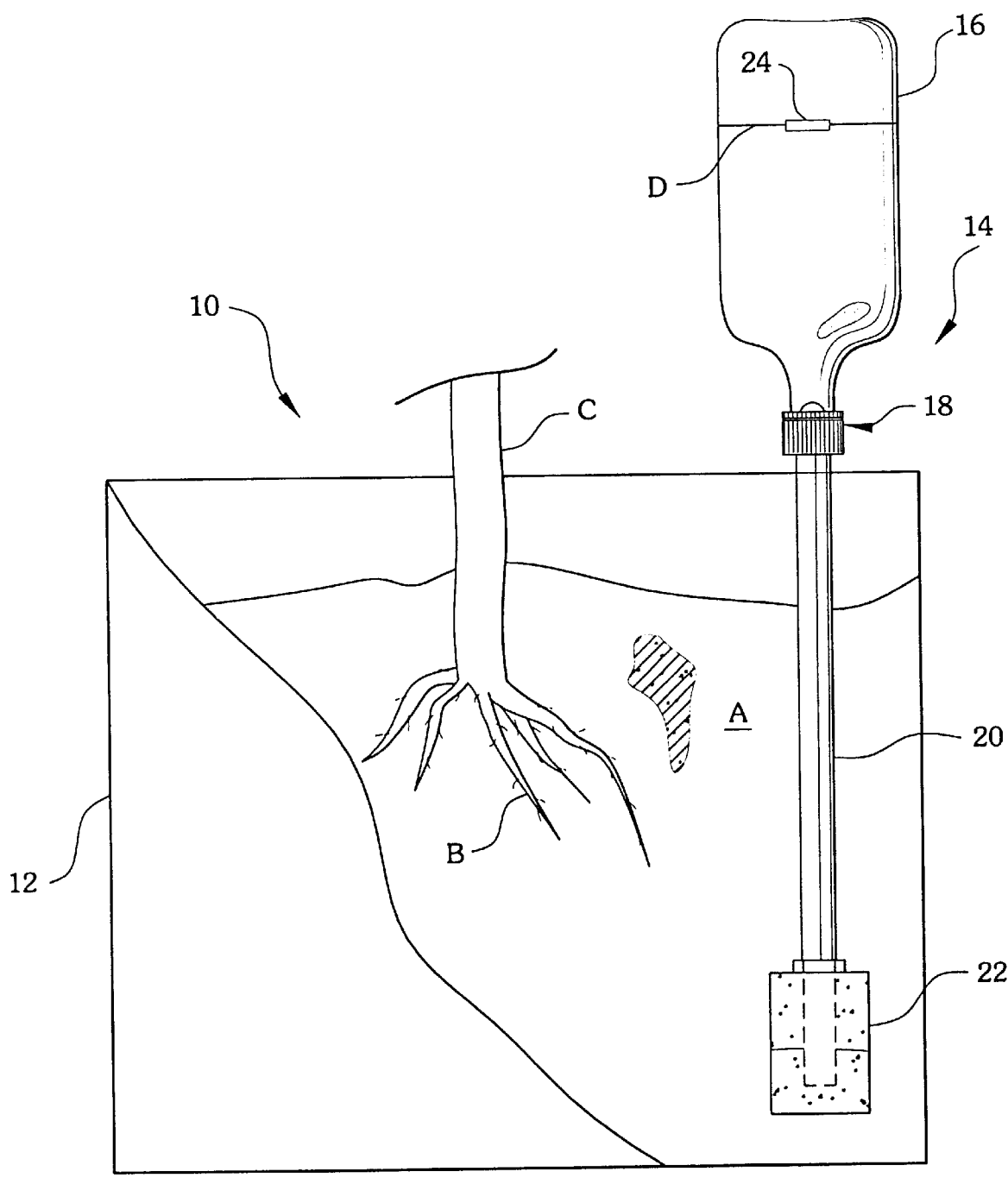
FIG. 1 is an environmental, elevational view of an automatic watering pot according to the present invention.

The present invention is an automatic watering pot, designated generally as 10 in the drawings. As shown the FIG. 1, the automatic watering device 10 includes a flower pot 12, and an automatic watering device, designated generally as 14, the pot 12 being partially broken away in FIG. 1 to show the details of the water device 14. The automatic watering device 14 may be made integral with the pot 12, or may be marketed separately as an after market add on to an existing flower pot. The pot 12 may have any size, shape, or construction conventionally known in the art. It is preferred, however, that the pot 12 have sufficient weight to provide a counterweight to support the automatic watering device when the reservoir is filled with water. For this purpose, the bottom wall of the pot 12 may be thickened, lined with stones or have an appropriate counterweight in a false bottom (not shown).

Figure 2:
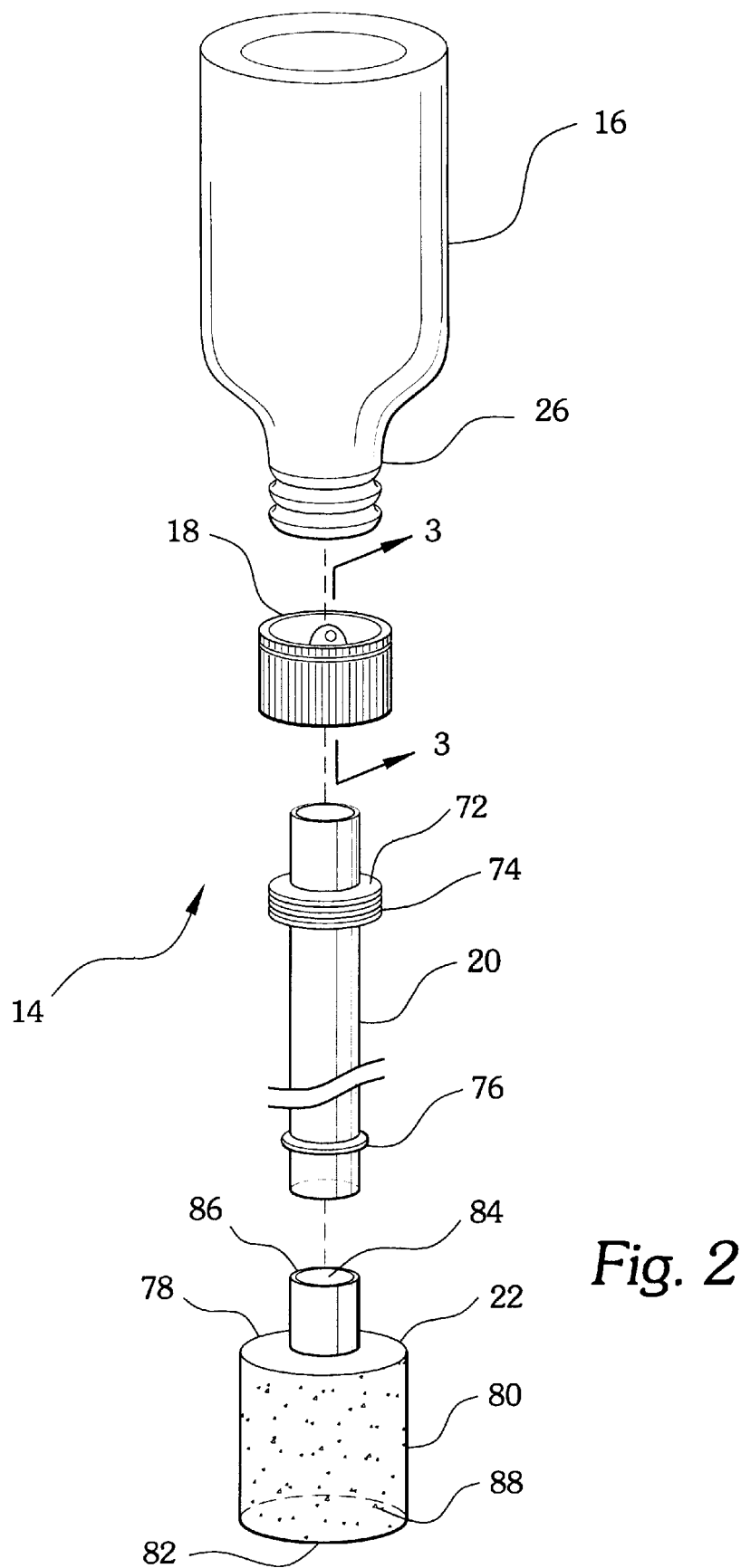
FIG. 2 is an exploded, perspective view of the automatic watering device of an automatic watering pot according to the present invention.

The automatic watering device 14, as shown in FIGS. 1 and 2, includes a bottle 16, a cap 18, a delivery tube 20, and a dispersion chamber 22. The watering device 14 is installed in the pot 12 with the bottle 16 inverted vertically above the pot 12, the bottle 16 and cap 18 being disposed above the level of the soil A, the tube 20 extending into the interior of the pot 12 and soil A, and the dispersion chamber 22 being disposed at or below the level of the roots B of a plant C. Although the watering device 14 may supported simply by anchoring the tube 20 in sufficient soil A, preferably either the tube 20 or dispersion chamber 22 or both are attached to the pot 12 by any means conventionally known in the industry, as by clamping, by adhesives, or similarly effective means.

The bottle 16 serves as a water reservoir. It is made from a translucent material so that the water level may be visually discerned. Preferably, the bottle 16 is clear or transparent, and may optionally be provided with a colored float 24, as shown in FIG. 1, made from any buoyant material which floats at the top of the water level D in the bottle 16. The bottle 16 has a neck 26 with an open mouth defined therein and with appropriate fittings for connection to the cap 18, preferably threaded fittings. The bottle 16 is preferably made from a lightweight material, such as polyethylene, polypropylene, or other thermoplastic material.

Figure 3:
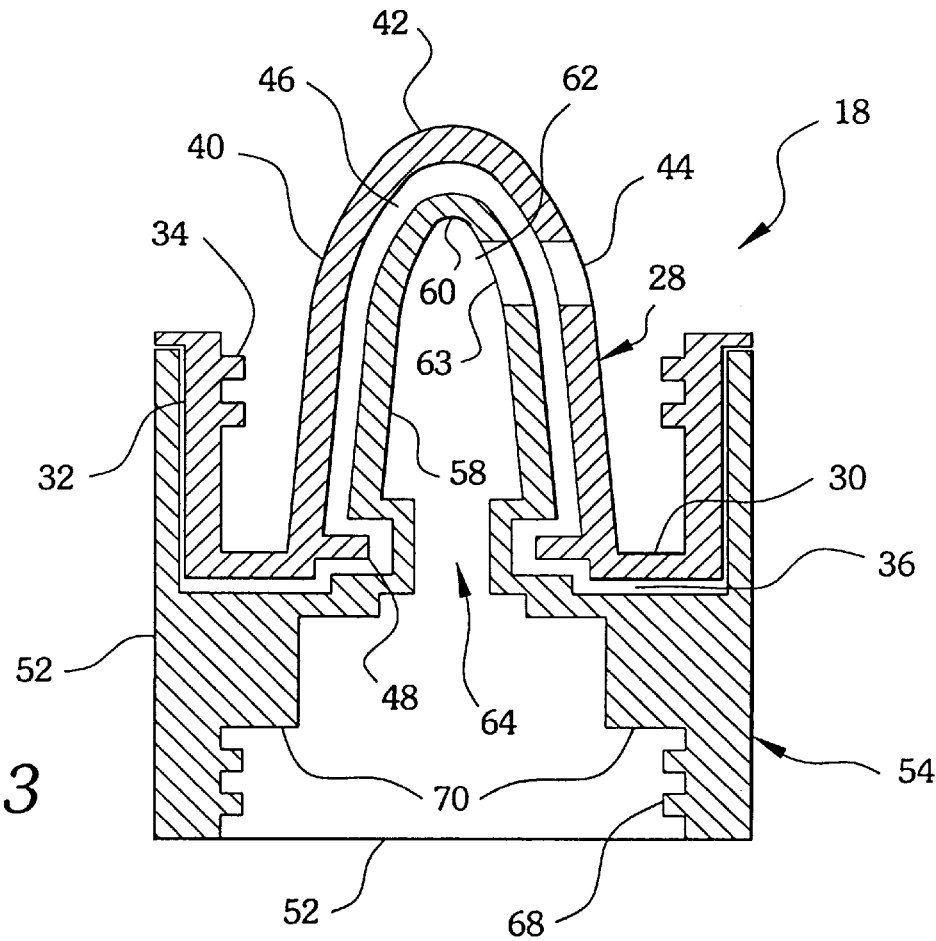
FIG. 3 is a section view along 3—3 of FIG. 2.
Figure 4:
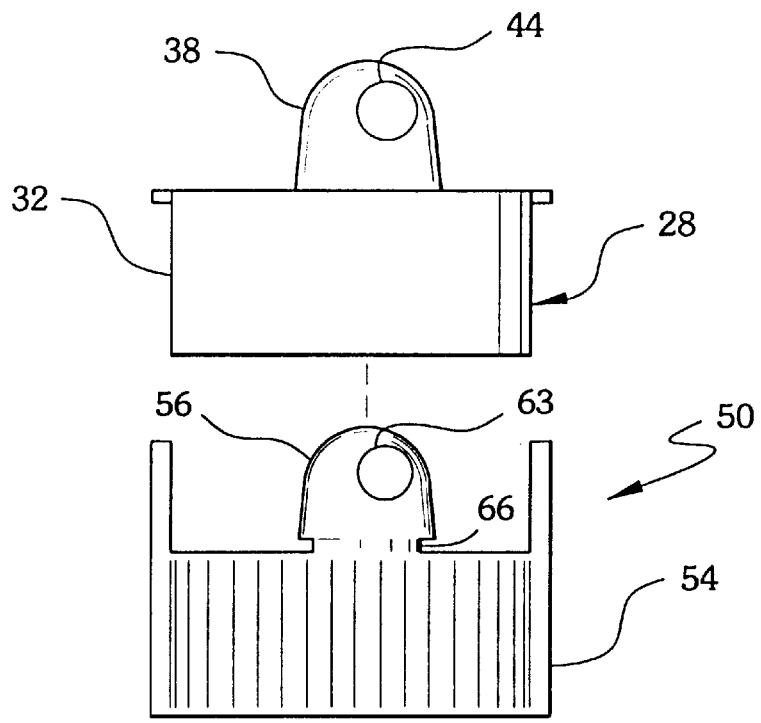
FIG. 4 is an exploded view of the cap of the automatic watering device of an automatic watering pot according to the present invention.

The cap 18 is shown in more in FIGS. 3 and 4. The cap 18 includes an inner section 28 and an outer section 50. The inner section 28 is generally cylindrical in shape, having a circular base wall 30 and a sidewall forming a skirt 32, the top being open. The inside of the sidewall 32 has appropriate fastening means 34 for removably connecting the cap 18 to the bottle 16 with an air tight and water tight connection. Preferably, the sidewall 32 is equipped with threads which interlock with threads on the neck 26 of the bottle 16, although the fastener may be a snap type connection. The base wall 30 has a circular opening 36 defined therein. A tubular projection 38 is mounted on the base wall 30 concentric with the opening 36 and extending in the same direction as the sidewalls 32, the projection 38 having an annular sidewall 40 and a domed roof 42. The projection 38 has a circular port 44 defined in the sidewall 40. The projection defines a cavity 46. An annular flange 48 projects into the cavity 46 at the base of the annular sidewall 40.

The outer section 50 is generally cylindrical, having a circular base wall 52 and a sidewall or skirt 54, the outer section 50 being open at the bottom. A tubular projection 56 is mounted on the base wall 52, the projection having an annular sidewall 58 and a domed roof 60 defining a cavity 62, the annular sidewall 58 defining an opening 64 in the base wall 52. The projection has a circular port 63 defined therein. An annular groove 66 is defined at the base of the exterior of the annular side wall 58. The interior of the sidewall 54 of the outer section 50 has a fastening means 68 defined therein for removably attaching the cap 18 to the tube 20, the fastening means 68 preferably being threads. A portion of the sidewall 54 may project interiorly to form a guide 70 or seal for an end of the tube 20 in order to guide the flow of water through the cap 18 and into the tube 20, and in order to form an air tight connection between the cap 18 and the tube 20.

The cap 18 is assembled with the projection 56 of the outer section 50 being disposed in the cavity 46 defined by the projection 38 of the inner section 28, the flange 48 locking into the groove 66 to maintain the inner 28 and outer 50 sections in fixed relation vertically. The inner section 28 may be temporarily attached to the bottle with the projection 38 extending into the neck of the bottle 26. The inner section 28 and outer section 50 may be rotated about a vertical axis, the flange 48 sliding in the groove 66. When the ports 44, 63 are aligned, a passage for the flow of fluids, such as water and air, into and out of the bottle 16 is defined. When the ports 44, 63 are not aligned, the flow of water is blocked. Thus, the cap 18 acts as a rotary valve.

It will be understood that the specific structure of the cap 18 has been shown for enabling purposes. It will be obvious to those skilled in the art that other methods of constructing the cap 18 to act as a rotary valve may be employed, the scope of the present invention being intended to cover any cap 18 having an inner section rotatably mounted on an outer section, the base walls of the inner and outer sections having ports defined therein which permit or block the passage of fluids by aligning the ports.

It will also be obvious to those skilled in the art that the cap 18 may be constructed as a one piece hollow, cylindrical cap attached to the reservoir at one end and the tube at the other. It will be seen that with this construction the cap 18 is a hollow pipe, and therefore any other form of pipe valve may be disposed within the cap 18 to shut off the flow of water from the reservoir to the tube when refilling the reservoir, such as a butterfly type valve disposed in the interior, and a handle for operating the valve on the exterior of the cap. Other types of valves which may be used include globe valves and gate valves.

The tube 20 is an elongated, hollow cylinder or pipe, preferably rectilinear, for the passage of water from the bottle to the dispersion chamber 22. At one end the tube 20 has an annular, disk-shaped flange 72 about its circumference. The edge of the flange 72 has a fastening means 74 defined therein, preferably threads, adapted for cooperating with the fastening means 68 defined in the outer section 50 of the cap 18 to provide an airtight and watertight releasable connection between the tube 20 and the cap 18. One or more O-rings (not shown) may be disposed about the end of the tube 20 to ensure a good seal. The opposite end of the tube has an annular flange 76 disposed about its circumference for limiting the depth to which the tube 20 may be inserted into the dispersion chamber 22, and may include fastening means (not shown) for connecting the tube 20 to the dispersion chamber 22.

The dispersion chamber 22 is a hollow, preferably cylindrical chamber defined by a top wall 78, a bottom wall 80 and an annular side wall 82. The top wall 78 has a circular opening 84 defined therein which may be defined by a collar 86, the opening having a diameter slightly greater than the diameter of the tube 20 so that the tube 20 may be inserted through the opening 84. The flange 76 limits the extent to which the tube 20 extends into the chamber 22, so that there is a gap between the end of the tube 20 and the bottom wall 80 of the chamber 22. The tube 20 may be fixedly attached to the dispersion chamber 22, e.g., by an adhesive, or removably attached by cooperating fasteners on the tube 20 and chamber 22, or the tube 20 may be frictionally received within the collar 86.

Preferably, the sidewall 80 of the chamber 22 has a plurality of orifices 88 defined therein. The orifices 88 are pinhole size, having a very small diameter, permitting the passage of water and air through the orifices 88, but acting as a filter to block the flow of soil particles into the chamber 22. Alternatively, the sidewall 80 may be made from a material permeable to water and air.

In operation, the cap 18 is removed from the bottle 16, the bottle 16 is filled with water to the desired level, and the cap 18 is replaced of the bottle 16. The outer section 50 of the cap 18 is rotated so that the ports 44, 63 are not aligned. The bottle 16 is inverted and the cap 18 is fastened to the tube 20, the tube 20 having been previously disposed in the pot 12 with the dispersion chamber 22 at or below the level of the roots B. The outer section 50 of the cap 18 is rotated so the ports 44, 63 are aligned and water flows through the tube 20 by gravity, being displaced by air, until the level of the water in the dispersion chamber 22 is above the level of the end of the tube 20, as shown in FIG. 1. As the soil dries through evaporation of water or through absorption by the plant C, the water level in the dispersion chamber 22 drops below the end of the tube 20, breaking the water seal, the diameter of the tube 20 being sufficiently wide to prevent the tube 20 being sealed by surface tension. Air passes from the soil through the orifices 88 into the dispersion chamber 22, enters the tube 20 and rises to the top of the bottle 16, forcing water down through the tube 20 and through the orifices 88 into the soil A until the water level in the dispersion chamber 22 again rises above the end of the tube 20.

Figure 5:
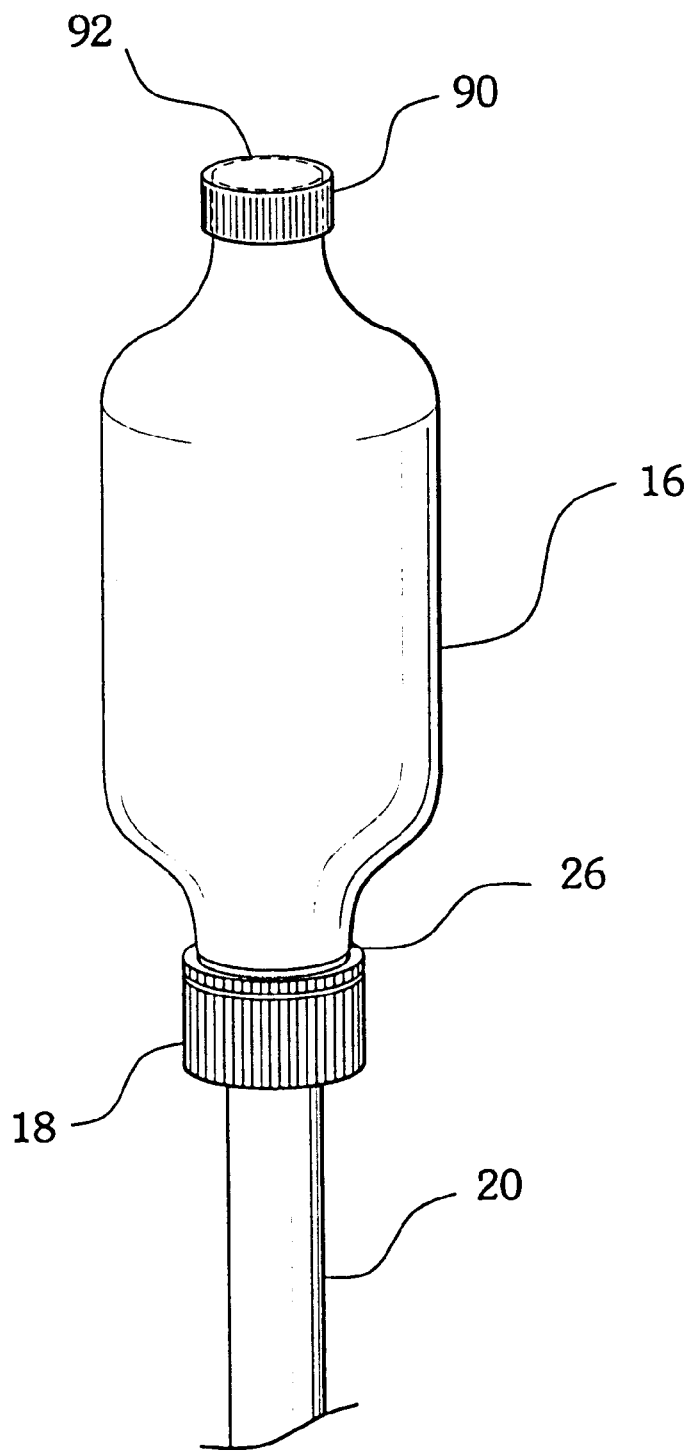
FIG. 5 is a fragmented view of an alternate embodiment of the automatic watering device of an automatic watering pot according to the present invention.

The capacity of the bottle 16 is limited by the ability of the pot 12 filled with soil to counterbalance the weight of the water filled bottle 16, and by the strength of the tube 20, but for many plants the capacity should be sufficient to supply the plant's needs for several days or weeks. FIG. 5 shows an alternative embodiment of the bottle 16 in which the bottle 16 is equipped with a second cap 90 disposed 180° from the first cap 18, the second cap 90 being removably mounted to open a second mouth 92 in the bottle 16 which is oriented vertically upwards with the bottle inverted so that the bottle may be filled without removing the bottle 16 from the tube 20 by rotating the cap 18 to close the valve and pouring water through the mouth 92.

The flower pot 12 may be made from clay, ceramic, plastic, or any other material conventionally known in the art. The automatic watering device is preferably made from thermoplastic material, such as polyethylene or polypropylene.

Figure 6:
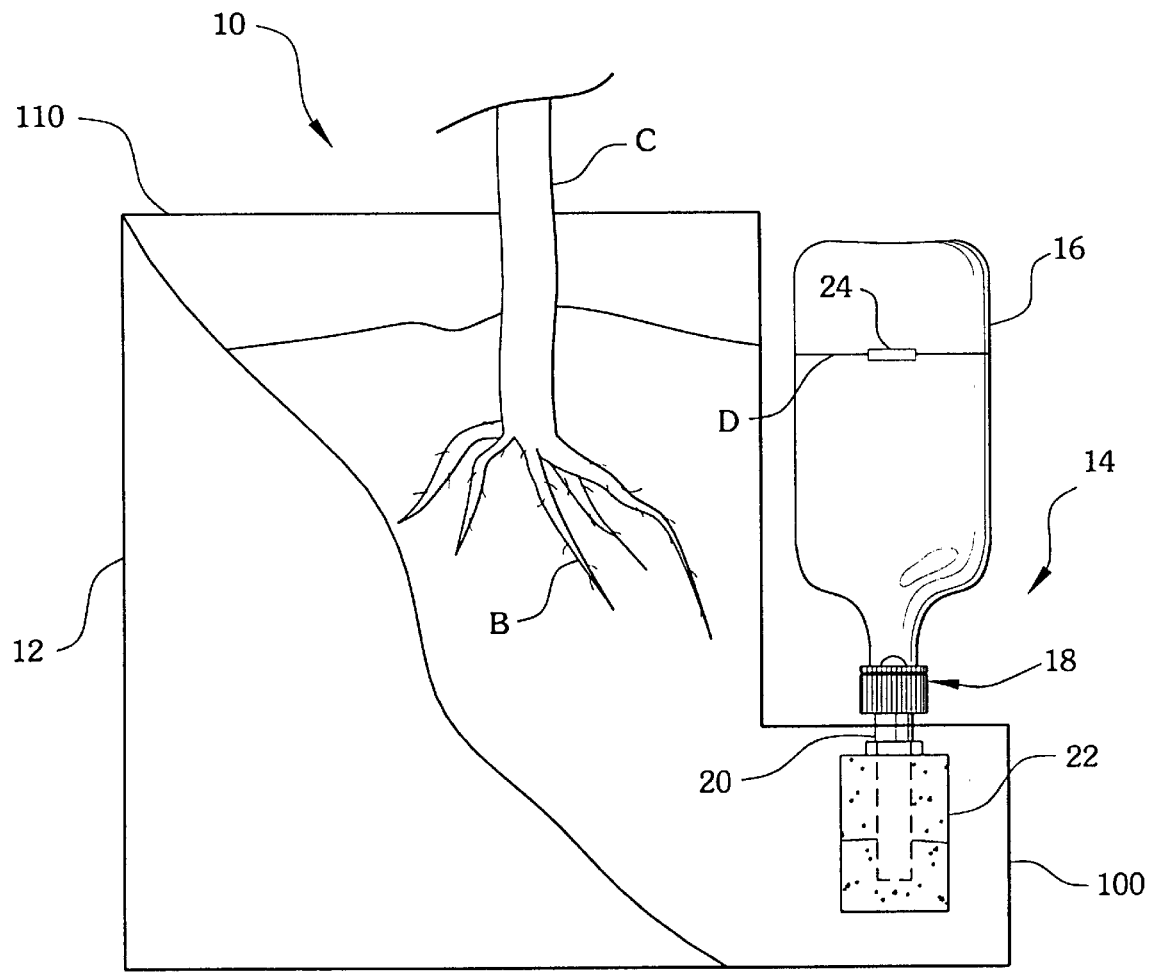
FIG. 6 is an alternative embodiment of an automatic watering pot according to the present invention.

FIG. 6 shows an alternative embodiment of an automatic watering pot 10 according to the present invention. The embodiment shown in FIG. 6 differs from the embodiment of FIG. 1 in that the flower pot 12 is a multilevel pot having an upper level 110 and a lower level 100. The plant C is disposed in the upper level 110. The lower level 100 of the pot has a height lower than the upper level 110 of the pot by a length at least equal to the height of the bottle 16 with the cap 18 attached. The automatic watering device 14 is installed in the lower level 100 of the pot 12, the bottle 16 inverted vertically above the lower level 100 of the pot 12, the bottle 16 and cap 18 being disposed above the level of the soil A in the lower level 100, the tube 20 extending into the interior of the lower level 100 of the pot 12 and soil A, and the dispersion chamber 22 being disposed at or below the level of the roots B of a plant C. The length of the tube 20 is shortened, so that the automatic watering device 14 does not project above the top of the upper level 110. In all other respects, the embodiment shown in FIG. 6 is identical to the embodiment shown in FIG. 1, and therefore will not be described further.

It is to be understood that the present invention is not limited to the embodiments described above, but encompasses any and all embodiments within the scope of the following claims.

What is claimed is:

1. An automatic watering pot comprising a flower pot and an automatic watering device attached to said pot, the automatic watering device comprising:

a) a bottle having a neck, the neck defining an open mouth and having a fitting for coupling to a cap;

b) a hollow cylindrical cap removably fastened to said bottle, the cap having an inner section and an outer section, the inner and outer sections each having a wall with a port defined therein, the inner section rotating with respect to the outer section between an open position in which the ports are aligned in order to permit the flow of fluids into and out of said bottle, and a closed position in which said ports are out of register in order to prevent the flow of fluids into and out of said bottle;

c) an elongated, hollow tube having a first end and a second end, the first end of said tube being connected to said cap by an airtight and watertight seal, said tube forming a passage for the flow of fluids into and out of said bottle;

d) a hollow dispersion chamber, the second end of said tube extending into the dispersion chamber, the chamber having at least one orifice defined therein for the flow of fluid between the chamber and the interior of said pot; and e) wherein said bottle is disposed in an inverted position vertically above said pot, and wherein said tube and said dispersion chamber extend into the interior of said pot.

2. The automatic watering pot according to claim 1, wherein:

a) the inner section of said cap is generally cylindrical in shape, having a circular base wall and a sidewall, the top of the cylinder being open, the inside of the sidewall having appropriate fastening means for removably connecting said cap to said bottle, a tubular projection being mounted on the base wall extending in the same direction as the sidewalls, a port being defined in the projection, the projection defining a cavity, an annular flange projecting into the cavity;

b) the outer section is generally cylindrical, having a circular base wall and a sidewall, the outer section being open at the bottom, a tubular projection being mounted on the base wall, the projection defining a cavity and having a port defined therein, an annular groove being defined at the base of said projection, the interior of the sidewall of the outer section having a fastening means defined therein for removably attaching said cap to said tube; and c) the projection of the outer section is disposed in the cavity defined by the projection of the inner section, the flange locking into the groove to maintain the inner and outer sections in fixed relation vertically, the inner section and outer section being rotatable about a vertical axis with respect to each other, the flange sliding in the groove.

3. The automatic watering pot according to claim 1, wherein said tube further comprises:

a) an annular, disk-shaped flange disposed about the first end of said tube, the edge of the flange having a threaded fitting adapted for cooperating with the fastening means defined in the outer section of said cap in order to provide an airtight and watertight releasable connection between said tube and said cap; and b) a second annular flange disposed about the second end of said tube for limiting the depth to which said tube may be inserted into said dispersion chamber.

4. The automatic watering pot according to claim 1, wherein said bottle is made from a transparent material.

5. The automatic watering pot according to claim 1, wherein said bottle is made from a translucent material.

6. The automatic watering pot according to claim 1, further comprising a float disposed within said bottle, said float being made from a buoyant, colored material, so that said float gives a visual indication of the level of any water in said bottle when said bottle is transparent.

7. The automatic watering pot according to claim 1, wherein said dispersion chamber further comprises a hollow, cylindrical chamber defined by a top wall, a bottom wall and an annular side wall, the top wall having a circular opening defined therein, the opening having a diameter slightly greater than the diameter of said tube so that said tube may be inserted through the opening, the second end of said tube being disposed above the bottom wall of said chamber so that there is a gap between the end of said tube and the bottom wall of said chamber.

8. The automatic watering pot according to claim 7, wherein the sidewall of said chamber has a plurality of pinhole orifices defined therein for permitting the flow of air and water between said pot and said chamber while preventing the flow of soil particles into said chamber.

9. The automatic watering pot according to claim 7, wherein the sidewall of said chamber is made from a material permeable to water and air.

10. The automatic watering pot according to claim 1, wherein said bottle, said cap, said tube, and said dispersion chamber are made from a thermoplastic material.

11. An automatic watering device for the automatic watering of a potted plant in a flower pot, comprising:

a) a bottle having a neck, the neck defining an open mouth and having a fitting for coupling to a cap;

b) a hollow cylindrical cap removably fastened to said bottle, the cap having an inner section and an outer section, the inner and outer sections each having a wall with a port defined therein, the inner section rotating with respect to the outer section between an open position in which the ports are aligned in order to permit the flow of fluids into and out of said bottle, and a closed position in which said ports are out of register in order to prevent the flow of fluids into and out of said bottle;

c) an elongated, hollow tube having a first end and a second end, the first end of said tube being connected to said cap by an airtight and watertight seal, said tube forming a passage for the flow of fluids into and out of said bottle;

d) a hollow dispersion chamber, the second end of said tube extending into the dispersion chamber, the chamber having at least one orifice defined therein adapted for the flow of fluid between the chamber and the interior of a flower pot; and e) wherein said bottle is adapted for being disposed in an inverted position vertically above a flower pot, and wherein said tube and said dispersion chamber are adapted to extend into the interior of the flower pot.

12. The automatic watering device according to claim 11, wherein:
   a) the inner section of said cap is generally cylindrical in shape, having a circular base wall and a sidewall, the top of the cylinder being open, the inside of the sidewall having appropriate fastening means for removably connecting said cap to said bottle, a tubular projection being mounted on the base wall extending in the same direction as the sidewalls, a port being defined in the projection, the projection defining a cavity, an annular flange projecting into the cavity;
   b) the outer section is generally cylindrical, having a circular base wall and a sidewall, the outer section being open at the bottom, a tubular projection being mounted on the base wall, the projection defining a cavity and having a port defined therein, an annular groove being defined at the base of said projection, the interior of the sidewall of the outer section having a fastening means defined therein for removably attaching said cap to said tube; and
   c) the projection of the outer section is disposed in the cavity defined by the projection of the inner section, the flange locking into the groove to maintain the inner and outer sections in fixed relation vertically, the inner section and outer section being rotatable about a vertical axis with respect to each other, the flange sliding in the groove.

13. The automatic watering device according to claim 11, wherein said tube further comprises:
   a) an annular, disk-shaped flange disposed about the first end of said tube, the edge of the flange having a threaded fitting adapted for cooperating with the fastening means defined in the outer section of said cap in order to provide an airtight and watertight releasable connection between said tube and said cap; and
   b) a second annular flange disposed about the second end of said tube for limiting the depth to which said tube may be inserted into said dispersion chamber.

14. The automatic watering device according to claim 11, wherein said bottle is made from a translucent material.

15. The automatic watering device according to claim 11, wherein said bottle is made from a transparent material.

16. The automatic watering device according to claim 11, further comprising a float disposed within said bottle, said float being made from a buoyant, colored material, so that said float gives a visual indication of the level of any water in said bottle when said bottle is transparent.

17. The automatic watering device according to claim 11, wherein said dispersion chamber further comprises a hollow, cylindrical chamber defined by a top wall, a bottom wall and an annular side wall, the top wall having a circular opening defined therein, the opening having a diameter slightly greater than the diameter of said tube so that said tube may be inserted through the opening, the second end of said tube being disposed above the bottom wall of said chamber so that there is a gap between the end of said tube and the bottom wall of said chamber.

18. The automatic watering device according to claim 17, wherein the sidewall of said chamber has a plurality of pinhole orifices defined therein adapted for permitting the flow of air and water between a flower pot and said chamber while preventing the flow of soil particles into said chamber.

19. The automatic watering device according to claim 17, wherein the sidewall of said chamber is made from a material permeable to water and air.

20. The automatic watering device according to claim 11, wherein said bottle, said cap, said tube, and said dispersion chamber are made from a thermoplastic material.

21. An automatic watering pot comprising a flower pot and an automatic watering device attached to said pot, the automatic watering device comprising:
   a) a bottle having a neck, the neck defining an open mouth and having a fitting for coupling to a cap;
   b) a hollow cylindrical cap removably fastened to said bottle, the cap having an inner section and an outer section, the inner and outer sections each having a wall with a port defined therein, the inner section rotating with respect to the outer section between an open position in which the ports are aligned in order to permit the flow of fluids into and out of said bottle, and a closed position in which said ports are out of register in order to prevent the flow of fluids into and out of said bottle;
   c) an elongated, hollow tube having a first end and a second end, the first end of said tube being connected to said cap by an airtight and watertight seal, said tube forming a passage for the flow of fluids into and out of said bottle;
   d) a hollow dispersion chamber, the second end of said tube extending into the dispersion chamber, the chamber having at least one orifice defined therein for the flow of fluid between the chamber and the interior of said pot; and
   e) wherein said pot is a multilevel pot having an upper level and a lower level, the lower level having a height less than the height of the upper level by at least the length of said bottle with said cap attached, said bottle is disposed in an inverted position vertically above the lower level of said pot, and wherein said tube and said dispersion chamber extend into the interior of the lower level of said pot so that no portion of said automatic watering device extends above the height of the upper level of said pot.

* * * * *